(12) United States Patent
Gusev et al.

(10) Patent No.: US 8,438,573 B2
(45) Date of Patent: May 7, 2013

(54) DEPENDENCY ON A RESOURCE TYPE

(75) Inventors: Andrey Gusev, Dublin, CA (US); Sarat B. Kakarla, Sunnyvale, CA (US); Juan Tellez, Piedmont, CA (US); Jonathan Creighton, Oakland, CA (US)

(73) Assignee: Oracle International Corporation, Redwood Shores, CA (US)

( * ) Notice: Subject to any disclaimer, the term of this patent is extended or adjusted under 35 U.S.C. 154(b) by 532 days.

(21) Appl. No.: 12/688,739

(22) Filed: Jan. 15, 2010

(65) Prior Publication Data
US 2011/0179419 A1  Jul. 21, 2011

(51) Int. Cl.
G06F 9/46 (2006.01)
G06F 15/173 (2006.01)

(52) U.S. Cl.
USPC ........... 718/104; 718/105; 709/223; 709/224; 709/225; 709/226

(58) Field of Classification Search ........................ None
See application file for complete search history.

(56) References Cited

U.S. PATENT DOCUMENTS

| | | | |
|---|---|---|---|
| 6,154,849 A | 11/2000 | Xia | |
| 6,308,163 B1 * | 10/2001 | Du et al. | 705/7.25 |
| 6,393,485 B1 | 5/2002 | Chao et al. | |
| 6,516,350 B1 | 2/2003 | Lumelsky et al. | |
| 6,782,408 B1 | 8/2004 | Chandra et al. | |
| 6,931,640 B2 | 8/2005 | Asano et al. | |
| 7,281,045 B2 | 10/2007 | Aggarwal et al. | |
| 7,340,578 B1 * | 3/2008 | Khanzode | 711/170 |
| 7,383,383 B1 * | 6/2008 | Bandopadhyay et al. | 711/114 |
| 7,392,421 B1 | 6/2008 | Bloomstein et al. | |
| 7,451,201 B2 | 11/2008 | Alex et al. | |
| 7,464,147 B1 * | 12/2008 | Fakhouri et al. | 709/223 |
| 7,484,223 B2 * | 1/2009 | Hill et al. | 719/320 |
| 7,581,224 B2 | 8/2009 | Romero | |
| 7,827,302 B2 * | 11/2010 | Weinert et al. | 709/235 |
| 8,020,034 B1 * | 9/2011 | Shrivastava et al. | 714/4.11 |
| 8,154,554 B1 | 4/2012 | Brown et al. | |
| 8,180,922 B2 | 5/2012 | Dini et al. | |
| 2002/0087665 A1 * | 7/2002 | Marshall et al. | 709/220 |
| 2002/0120744 A1 * | 8/2002 | Chellis et al. | 709/226 |
| 2002/0124085 A1 * | 9/2002 | Matsuda et al. | 709/226 |
| 2002/0198984 A1 * | 12/2002 | Goldstein et al. | 709/224 |
| 2002/0198996 A1 * | 12/2002 | Sreenivasan et al. | 709/226 |
| 2004/0226025 A1 | 11/2004 | Beaudoin et al. | |
| 2005/0177628 A1 | 8/2005 | Victoria et al. | |
| 2005/0198275 A1 | 9/2005 | D'Alo et al. | |
| 2005/0234931 A1 | 10/2005 | Yip et al. | |

(Continued)

OTHER PUBLICATIONS

Strohm, Richard, "Oracle Clusterware Adminstration and Deployment Guide", 11g Release 1 (11.1), dated Sep. 2007, 180 pages.

(Continued)

*Primary Examiner* — Emerson Puente
*Assistant Examiner* — Adam Lee
(74) *Attorney, Agent, or Firm* — Hickman Palermo Truong Becker Bingham Wong LLP

(57) ABSTRACT

A clusterware manager on a cluster of nodes interprets a resource profile. The resource profile defines resource profile attributes. The attributes include at least one attribute that defines a cluster dependency based on resource type. The attribute does not identify any particular resource of that resource type. Dependencies between resources are managed based on the attribute that specifies the cluster dependency.

12 Claims, 4 Drawing Sheets

U.S. PATENT DOCUMENTS

| | | | |
|---|---|---|---|
| 2006/0047813 A1* | 3/2006 | Aggarwal et al. | 709/226 |
| 2006/0053410 A1 | 3/2006 | Charisius et al. | |
| 2006/0163338 A1 | 7/2006 | Allen et al. | |
| 2006/0195448 A1* | 8/2006 | Newport | 707/8 |
| 2006/0206860 A1 | 9/2006 | Dardinski | |
| 2007/0168965 A1 | 7/2007 | Zenz et al. | |
| 2007/0174101 A1* | 7/2007 | Li et al. | 705/8 |
| 2008/0021917 A1* | 1/2008 | Baker et al. | 707/102 |
| 2008/0052719 A1* | 2/2008 | Briscoe et al. | 718/104 |
| 2008/0141261 A1 | 6/2008 | Machida | |
| 2008/0209397 A1* | 8/2008 | Mohindra et al. | 717/120 |
| 2008/0222642 A1 | 9/2008 | Kakarla et al. | |
| 2008/0312982 A1* | 12/2008 | Braun et al. | 705/7 |
| 2008/0320460 A1* | 12/2008 | Miller et al. | 717/162 |
| 2009/0037367 A1 | 2/2009 | Wein | |
| 2009/0043809 A1* | 2/2009 | Fakhouri et al. | 707/102 |
| 2009/0054140 A1 | 2/2009 | Beser et al. | |
| 2009/0172668 A1 | 7/2009 | Bobak et al. | |
| 2009/0222540 A1* | 9/2009 | Mishra et al. | 709/222 |
| 2009/0290483 A1 | 11/2009 | Curtis et al. | |
| 2009/0328024 A1* | 12/2009 | Li et al. | 717/169 |
| 2010/0064009 A1* | 3/2010 | Chen et al. | 709/205 |
| 2010/0107172 A1 | 4/2010 | Calinescu et al. | |
| 2010/0161290 A1* | 6/2010 | Duchenay et al. | 703/2 |
| 2010/0241896 A1 | 9/2010 | Brown et al. | |
| 2010/0257535 A1 | 10/2010 | Badovinatz et al. | |
| 2010/0332659 A1* | 12/2010 | Marowsky-Bree et al. | 709/226 |
| 2011/0119681 A1* | 5/2011 | Spencer et al. | 718/106 |
| 2011/0125895 A1 | 5/2011 | Anderson et al. | |
| 2011/0145392 A1 | 6/2011 | Dawson et al. | |
| 2011/0179169 A1 | 7/2011 | Gusev et al. | |
| 2011/0179170 A1 | 7/2011 | Gusev et al. | |
| 2011/0179171 A1 | 7/2011 | Gusev et al. | |
| 2012/0226788 A1 | 9/2012 | Jackson | |

OTHER PUBLICATIONS

Strohm, Richard, "Oracle Clusterware Adminstration and Deployment Guide", 11g Release 1 (11.2), dated Aug. 2009, 322 pages.

U.S. Appl. No. 12/688,710, filed Jan. 15, 2010, Final Office Action, Sep. 28, 2012.

U.S. Appl. No. 12/688,715, filed Jan. 15, 2010, Final Office Action, Nov. 2, 2012.

U.S. Appl. No. 12/688,723, filed Jan. 15, 2010, Office Action, May 3, 2002.

U.S. Appl. No. 12/688,710, filed Jan. 15, 2010, Office Action, May 7, 2012.

U.S. Appl. No. 12/688,715, filed Jan. 15, 2010, Office Action, May 11, 2012.

U.S. Appl. No. 12/688,769, filed Jan. 15, 2010, Office Action, Jun. 13, 2012.

U.S. Appl. No. 12/688,800, filed Jan. 15, 2010, Office Action, Jun. 25, 2012.

U.S. Appl. No. 12/688,735, filed Jan. 15, 2010, Office Action, Aug. 16, 2012.

U.S. Appl. No. 12/688,800, filed Jan. 15, 2010, Final Office Action, Jan. 2, 2013.

U.S. Appl. No. 12/688,735, filed Jan. 15, 2010, Final Office Action, Feb. 21, 2013.

U.S. Appl. No. 12/688,769, filed Jan. 15, 2010, Final Office Action, Jan. 3, 2013.

* cited by examiner

DEPENDENCY ON A RESOURCE TYPE

CROSS-REFERENCE TO RELATED APPLICATIONS

Benefit Claim

This application is related to the following applications: (1) application Ser. No. 12/688,710, entitled "Special Values In Oracle Clusterware Resource Profiles," filed on Jan. 15, 2010, the entire contents of which is hereby incorporated by reference as if fully set forth herein; (2) application Ser. No. 12/688,715, entitled "'Local Resource' Type As A Way To Automate Management Of Infrastructure Resources In Oracle Clusterware," filed on Jan. 15, 2010, the entire contents of which is hereby incorporated by reference as if fully set forth herein; (3) application Ser. No. 12/688,723, entitled "Unidirectional Resource and Type Dependencies In Oracle Clusterware," filed on Jan. 15, 2010, the entire contents of which is hereby incorporated by reference as if fully set forth herein; (4) application Ser. No. 12/688,800, entitled "Conditional Dependency in a Computing Cluster", filed on Jan. 15, 2010, the entire contents of which is hereby incorporated by reference as if fully set forth herein; (5) application Ser. No. 12/688,735, entitled "Self-Testable HA Framework Library Infrastructure", filed on Jan. 15, 2010, the entire contents of which is hereby incorporated by reference as if fully set forth herein; (6) application Ser. No. 12/688,769, entitled "Dispersion Dependency In Oracle Clusterware," filed on Jan. 15, 2010, the entire contents of which is hereby incorporated by reference as if fully set forth herein. The applicants hereby rescind any disclaimer of claim scope in the related applications.

FIELD OF THE INVENTION

The present invention relates to clusterware systems. More specifically, the invention relates to type-based resource dependencies in clusterware systems.

BACKGROUND

Clusterware

Clusterware is a general term that refers to a software product that is used to combine a set of nodes into a single entity, all members working together as a logical unit. A node may be a computer interconnected to other computers, or a server blade interconnected to other server blades in a grid. The single entity is referred to as a cluster or computer cluster. Clusterware allows this cluster to be controlled as a unit. For example, five nodes may be combined into a cluster, each node with its own combination of applications that may be supported by the cluster as a whole. An example of an application that may be installed on some or each of the nodes is a database management system (DBMS) such as those produced by Oracle Corporation, 500 Oracle Parkway, Redwood Shores Calif. Applications may be clusterware-aware (sometimes referred to as clusterware-enabled) and controllable by clusterware. These applications are designed to be deployed and managed using clusterware. Other applications may also be controlled by clusterware.

Clusterware may be implemented as middleware, residing between the operating system and any applications. Clusterware may also be implemented as part of the operating system. A cluster manager, or a node with management authority, manages the resources and services of a cluster. A component of the cluster manager known as the policy engine is the portion of clusterware responsible for managing services on the cluster according to policy specifications.

Clusterware Services

Services such as membership services are provided by the clusterware. Membership determines which computers or nodes are parts of the cluster, and which other servers can be substituted for the failed server in the cluster.

Resource management is another service provided by clusterware. Resource management techniques may vary with each clusterware product. In some implementations, clusterware considers everything it manages to be a resource, and what clusterware knows about each resource is defined in a resource profile for that resource. A resource may be anything that the clusterware manages, and may include any physical or logical entity that an application is comprised of, or uses to be able to provide services. Anything a resource depends upon may also be considered a resource. Physical entities may include hardware resources such as network cards, CPU, and memory. Logical entities may include resources such as IP addresses, applications, and processes such as daemons. Resources may depend on other resources, creating a hierarchy of resources. For example, a web server application is a resource that depends on an IP address, which is another resource.

To manage a resource means to direct resources and perform activities related to that resource. These activities may, for example, cause the resource to behave or be provisioned in a particular manner. Resource management includes placement and defining operability of resources within the cluster, including bringing resources online and taking them offline, as well as monitoring each resource. For example, putting an Internet Protocol (IP) address in the proper configuration location for a web server is a way of managing an IP address, while restarting the web server is a way of managing the web server. By managing the resources, the cluster manager is able to ensure the availability of resources in an environment requiring high availability of services. This is sometimes referred to as HA (high availability) resource management.

In some implementations, the resource profile controls what the clusterware will do when managing the resource. A resource profile is a collection of attributes having values that define the properties of the resource associated with the value. The attributes and properties may be made up of common or generic attributes and properties, or may be application specific. For example, if the resource crashes, the resource profile defines whether or not the particular resource, given the particular circumstance, will be restarted. As another example, if the resource keeps crashing, it may be relocated to another node in the cluster based on the configuration in the resource profile. Resource profiles may be grouped together to make up a logical group of profiles. This logical group of resource profiles is sometimes referred to as an HA (high availability) policy.

Clusterware Agents

Clusterware may use clusterware agents to assist in resource management activities. An agent is software comprising components of software modules that are invocable by other software modules that perform various actions on the applications or resources that manage the agent. Although a computing device actually performs agent functions pursuant to the instructions of the software modules, it is more convenient to describe the software modules as performing the functionality. There is no need to obfuscate the invention by defining the role of a computing device with respect to each particular function being performed, as the software modules themselves adequately define this role.

Agents may have application or client-side components that are specific to the application and clusterware or server-side components that support the generic clusterware interface, with an Application Programming Interface (API) connecting the two sides. Agents, acting as an intermediary, receive messages from the clusterware, and handle the messages based on the application-side components, or application-specific code. Additionally, the application-side components may receive information from the application such as resource state information that describes the state of the resource. This application-specific code determines, at the agent, what a particular clusterware message means for the particular application. For example, an application may need to save data in order to shut down gracefully. Therefore, a "stop" command generated by the clusterware may result in the agent asking the application to save data, followed by a command that causes the application to cease processing.

Resource Dependencies

Clusterware may also be used to manage resource relationships, such as resource dependencies. Described herein are approaches for creating new kinds of dependencies.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, a clusterware manager on a cluster of nodes interprets a resource profile. The resource profile defines resource profile attributes. The attributes include at least one attribute that defines a cluster dependency based on a resource type. The attribute does not identify any particular resource of that resource type. Clusterware dependencies between resources are managed based on the attribute that specifies the cluster dependency.

In another embodiment, the resource profile is associated with a first resource of a first type. The cluster dependency also specifies that the first resource depends on a second resource type.

In another embodiment, the attribute is inherited by the resource profile from a type profile. The type profile includes default dependency information that augments the resource profile information. This allows the default dependency information to supply values implied by exclusion. In this embodiment, the default dependency configuration information specifies that resources of the first type, by default, depend on the second type, creating a dependency on a type instead of a particular resource.

Structural and Functional Overview

Figure 1:
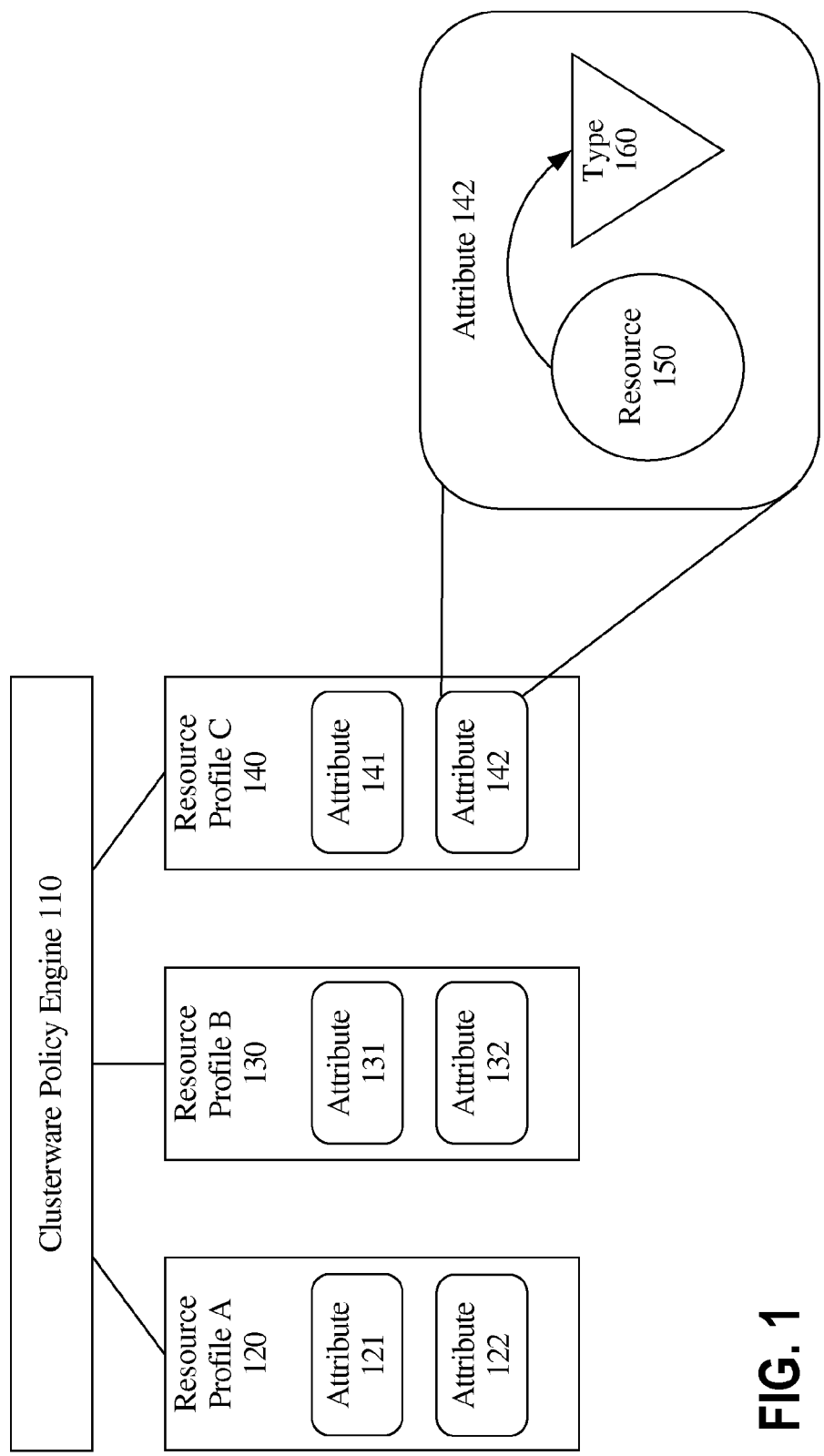
FIG. 1 is a block diagram illustrating an architecture on which an embodiment may be implemented.

FIG. 1 is a block diagram illustrating an architecture on which an embodiment may be implemented. A clusterware policy engine 110 is shown. Resource profiles (for example, resource profile A 120, resource profile B 130, and resource profile C 140) are accessible to clusterware policy engine 110. Each resource profile comprises attributes. For example, resource profile A 120 comprises attribute 121 and attribute 122. Resource profile B 130 comprises attribute 131 and attribute 132. Resource profile C 140 comprises attribute 141 and attribute 142. Resource profiles may comprise any number of attributes. An attribute 142 may define a dependency between a resource and a resource type. Clusterware policy engine manages resources based on dependencies and other attributes. Specifically, clusterware policy engine may manage resources based on dependencies that specify that a resource such as resource 150 depends on a resource type, such as type 160.

Clusterware Modeling

Clusterware modeling, or resource modeling, is a term that describes the ability to express functional requirements of clusterware applications. Requirements are expressed in terms of resources that represent the components of the application, as well as any dependencies and any relationships between resources and components. The ability to model resources in clusterware is an important aspect of a clusterware system, because resource modeling allows policy-based management to be performed by configuration, instead of implementation using custom code that requires maintenance with each release of the clusterware product.

The bulk of modeling is expressed in resource profiles. For example, a particular resource may depend on another resource in order to function properly. Other attributes 121 may also be expressed in a resource profile. For example, the cardinality of a resource, or the number of nodes on which a resource may be provisioned, may be expressed in a resource profile for the resource. Expressing these attributes in a resource profile and making the resource profile available to the clusterware policy engine 110 is known as "registering" the resource.

In some embodiments, resource dependencies may be expressed as an attribute in a resource profile, defining dependencies between resources. For example, if a web server application is moved from one node to another, an IP address must be provisioned at the node to which the web server application is being moved. If the web server application depends on a particular IP address, that particular IP address must be moved before the web server application will function properly. Therefore, the dependency relationship must be specified between the web server application, which is seen by the clusterware as a resource, and the IP address, which is seen by clusterware as a second resource. However, the dependencies are expressed with specific resources. For example, there has been no way to tell clusterware that a particular application depends on any IP address. In such an embodiment, clusterware is not allowed to just choose any of a number of available IP addresses to satisfy the dependency, but instead must provision the particular IP address associated with the particular application.

In other embodiments, different kinds of dependencies may be expressed in a resource profile for a resource. For example, a dependency in a resource profile for a particular HTTP server resource may indicate that the HTTP server depends on a particular IP (Internet Protocol) address resource, such as 10.1.1.90. This dependency may have attributes or properties of its own that further describe the nature of the dependency. For example, the dependency may be a hard dependency or a soft dependency.

Hard dependencies are a way of indicating that, if A has a hard dependency on B, A must be stopped when B's state is offline, unknown, or otherwise not in the online state. A hard dependency may also mean that actions performed with respect to B must also be performed with respect to A. For example, if B is relocated to another node, A must also be relocated to another node. Other dependency attributes may be used to indicate, in the model, that one resource must start or stop before another resource may become active.

The following is an example of a dependency attribute in a resource profile that specifies that the resource for which the resource profile is modeling, is dependent on a resource called "resourceB":
START_DEPENDENCIES=hard(resourceB)
The dependency is a start dependency, and a hard dependency. More than one dependency may be defined in a single resource profile. For example, the following line may be found in a single resource profile:
START_DEPENDENCIES=hard(resourceB, resourceA, resourceC)

No particular syntax for expressing dependencies or other attributes is required. For example, resource profile attributes may be expressed in XML in an embodiment. In another embodiment, dependencies may be expressed individually, as follows:

```
START_DEPENDENCIES=hard(resourceB)
START_DEPENDENCIES=soft(resourceA)
START_DEPENDENCIES=hard(resourceD)
STOP_DEPENDENCIES=intermediate(resourceC)
```

Resource Types

In an embodiment, resources may be assigned resource types, also referred to herein as "types". A resource type is an attribute of a resource. Resources are unique, but some resources are instances of the same kind of resource. For example, 10.1.2.3 and 10.2.3.4 may be classified as "IP addresses." Clusterware systems do not recognize types based on inherent properties of resources. Furthermore, attempting to ascribe a resource to a type based on observable properties rather than configured association would lead to incorrect typecasting when more than one resource type may be appropriate. Thus, a clusterware system needs to be specifically engineered to formally recognize types.

A type, as described herein, is not an abstract concept that may be deemed to be inherent in a particular resource. Instead, a type is an attribute that may be ascribed to resources, and must be formally defined. There is no requirement that the type ascribed to a resource make logical sense. For example, while it may be convenient to associate resources such as network interface cards with a type defined as "NIC" or "Network_Card," the network interface cards may be just as easily associated with a type defined as "Foo_Bar."

A type may be registered with the clusterware by creating a type definition. A type definition may be stored in any location format that the clusterware is capable of reading. The means of storage and storage format of type definitions may vary with each clusterware implementation. In one embodiment, type definitions are stored as a text file, and a reference to the text file is added to a clusterware configuration file. In another embodiment, type definitions are stored in XML format. The following represents only one example of a type definition:

```
NAME: T_ORACLE_DBMS
ATTRIBUTES:
    description: Oracle database management system
    query language: SQL
    version: string
```

Any number of attributes may be defined for a resource type. In addition, default values may be defined for a resource type, as discussed hereinafter under the section entitled "Type Attributes and Inheritance."

In order for a resource to be of a particular type, that resource must be registered as a resource of the particular type. For example, an Oracle DBMS application may have the following line in its associated resource profile:
Type: T_ORACLE_DBMS
Upon registration of the resource, the clusterware policy engine will consider the resource type T_ORACLE_DBMS when managing the resource.

In an embodiment, types may be used in dependencies. For example, a particular resource may be dependent on a particular type. Such a dependency is distinct from a dependency of a resource on another resource.

Figure 2:
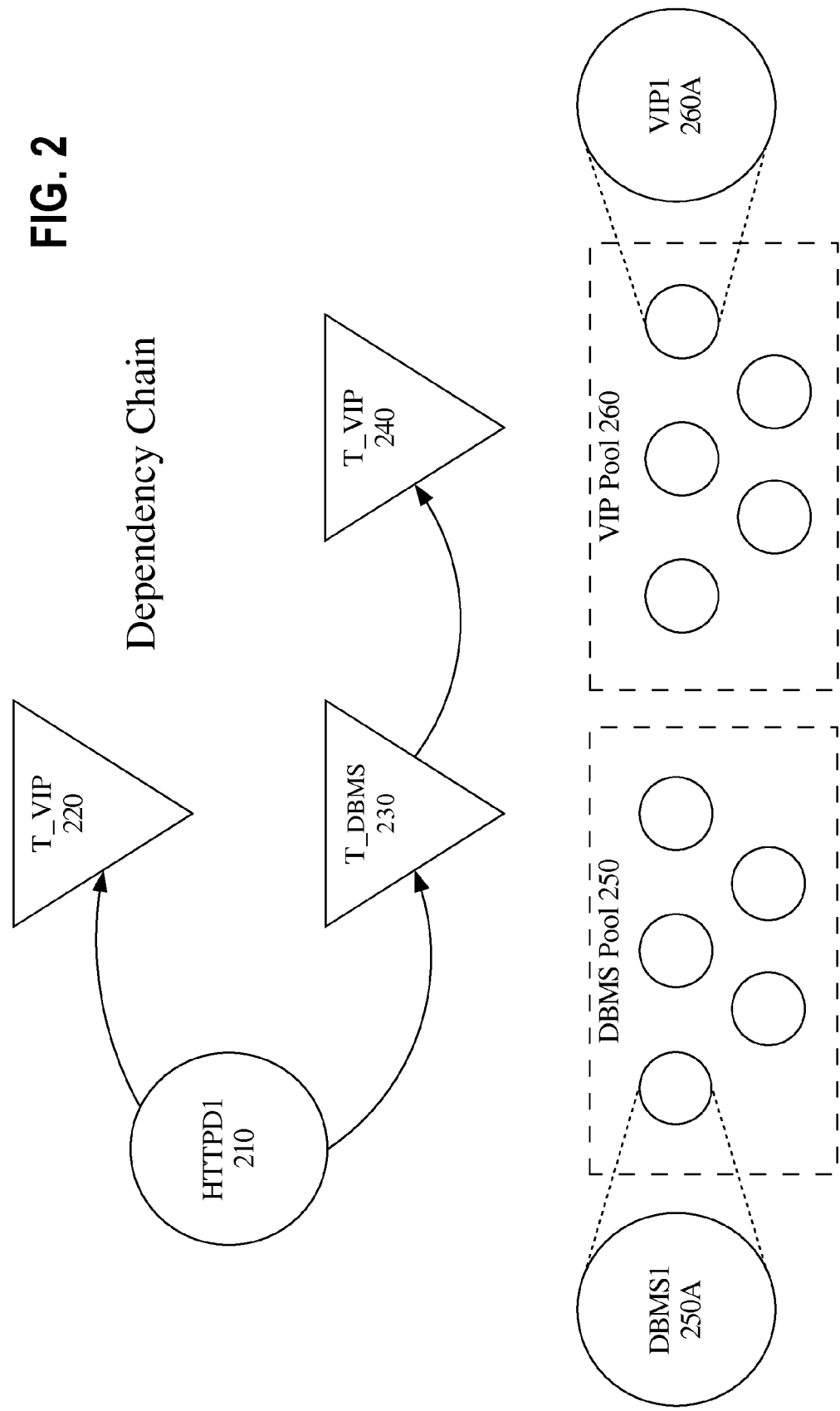
FIG. 2 is a block diagram illustrating a dependency chain in an embodiment.

FIG. 2 is a block diagram illustrating a dependency chain in an embodiment. The concept of a dependency chain will be discussed in detail later. As part of the dependency chain, a resource called HTTPD1 210, which represents a particular Hypertext Transfer Protocol Daemon, depends on a resource type T_VIP 240, which represents a Virtual IP address (VIP.) (In the diagrams, resources are depicted using circles, while types are depicted using inverted triangles.) This portion of the dependency depicted in FIG. 2 may be expressed in the resource profile associated with the resource HTTPD1 210 as follows:
START_DEPENDENCIES=hard(type: T_VIP)

In an embodiment, every resource is associated with a type. In another embodiment, resources may be associated with a type when such an association is deemed useful. Alternatively, resources that are not associated with a type inherit a generic type.

Having resources associated with types allows for flexibility within the clusterware system. This flexibility allows for the automatic management of resources by configuration in a way that was not previously possible. For example, a resource such as HTTPD1 210 may be dependent on a database management system (DBMS) in order to operate properly. No particular DBMS resource is required, so using modeling techniques described above, assuming that the name of the DBMS resource type is T_DBMS 230, the following line should be added to the resource profile for HTTPD1 210:

START_DEPENDENCIES=hard(type: T_DBMS)

Based on this configuration, the policy engine 110 will ensure that an instance of a resource having the type T_DBMS 230 will be started before the HTTPD1 210 resource is started. However, in the absence of further configuration, the policy engine 110 will not select any particular DBMS to satisfy the resource. Instead, the DBMS will be chosen without consideration of profile attributes associated with any particular available DBMS. For example, multiple DBMS resources may be available, as depicted by DBMS pool 250. DBMS1 250A may be chosen to satisfy the resource dependency that relies on the type T_DBMS 230. The criteria for choosing DBMS1 250A may be random, based on a queuing system, or any other criteria.

The above configuration allows for additional flexibility beyond the initial provisioning of resources. The dependency is used by the policy engine 110 during active management. For example, the anonymity of resources allows the clusterware policy engine 110 to reprovision resources in cases where a resource becomes unavailable. For example, the following dependency may be defined in the resource profile for HTTPD1 210:

START_DEPENDENCIES=hard(type: T_DBMS)

This means that HTTPD1 210, which is a resource, has a hard start dependency on the type T_DBMS. However, HTTPD1 210 is not dependent on any particular resource; the resource need only be associated with the type (T_DBMS) on which the resource depends. To satisfy this dependency, the clusterware policy engine 110 may start DBMS_2 (not shown), which is a DBMS of type T_DBMS. Subsequently, DBMS2 may become unavailable. If the dependency had been based on a particular resource, such as DBMS2, rather than a resource type, such as T_DBMS, the dependency would fail, and the policy engine 110 would require DBMS2 to be reactivated in order to satisfy the dependency. In such a scenario, if DBMS2 became permanently disabled, then HTTPD1 210 would also become permanently disabled until the configuration was altered to specify a different resource. But if HTTPD1 210 is dependent on a resource type, any DBMS will satisfy the dependency. Therefore, if DBMS2 becomes unavailable, the policy engine 110 will select an alternate DBMS from DBMS pool 250 to satisfy the resource.

The indirection created by resource name anonymity allows the set of resources to change over the lifetime of the cluster without changes to the dependency configuration. Furthermore, policy management functions remain with the clusterware policy engine 110, and are not required at the agent level, so the need to develop custom code to manage resources for particular applications is reduced. In addition, type-based dependencies require no additional logic to support a clusterware-enabled application, so any application can benefit from the use of types in a clusterware system.

Type Hierarchy

A type hierarchy may be defined within an embodiment of a clusterware system. A type hierarchy allows for types to have sub-types. For example, the type T_DBMS may have a sub-type of T_ORACLE_DBMS and another sub-type of T_MYSQL_DBMS to denote the Oracle database management system and the MySQL database management system, respectively. Each sub-type is a type that has a parent type. For example, a policy profile for HTTPD1 210 may include the attribute:

START_DEPENDENCIES=hard(type: T_ORACLE_DBMS)

This attribute denotes a hard start dependency on an Oracle DBMS resource. In this case, a MySQL database resource will not satisfy the dependency, so if an Oracle DBMS resource is not available, HTTPD1 210 will not be started.

A clusterware system may be implemented to allow sub-types, if available, to satisfy dependencies that require the parent type. For example, a policy profile for HTTPD1 210 may include the attribute:

START_DEPENDENCIES=hard(type: T_DBMS)

In an embodiment, all DBMS resources may be associated with a sub-type, such as T_ORACLE_DBMS or T_MYSQL_DBMS, leaving no DBMS resource associated with the parent type T_DBMS. However, if the clusterware is configured to allow a sub-type to satisfy a dependency on a parent type, then any resource associated with the T_ORACLE_DBMS or T_MYSQL_DBMS types may be used to satisfy the dependency above.

Resources of the same type may be arbitrarily associated with different sub-types for convenience. There need not be any readily ascertainable difference between resources of a first sub-type and resources of a second sub-type. For example, a first group of virtual IP addresses may be associated with a first type "T_VIP_DBMS," while a second group of virtual IP addresses may be associated with a second type "T_VIP_HTTPD." Both T_VIP_DBMS and T_VIP_HTTPD are sub-types of T_VIP. There may be no logical distinction between the IP addresses. For example, the sub-type with which the VIP is associated with may not be based on the subnet in which the VIP resides. Instead, the VIPs may be segmented for the purposes of assigning one VIP group to database management system instances (T_VIP_DBMS) and the other to web server instances (T_VIP_HTTPD). Knowing which VIPs are associated with a particular type of resource may be useful for management activities, such as network monitoring, which may include the use of third party software. Groups of resources may be created, through the use of sub-types, for any reason.

Type Attributes and Inheritance

Although types are not resources that are "managed," types may have properties associated with them by definition. Aside from a name, and a parent type (or base type), type definitions may provide attributes that may be inherited as "default" attributes by resources that are associated with the type. The following listing is an example of a type definition:

NAME: T_ComputerMonitor
BASE_TYPE: T_Monitor
ATTRIBUTES:
    screen kind: string
    dimension: string
    supported resolutions: string
    weight: integer The name is the name of the type. The base type is the parent type of the type. Attributes are a set of optional attribute definitions. Each attribute includes the name of the attribute and the type of attribute (string or integer, for example). The type definition above is shown as a non-limiting example. Attributes may be added, changed, removed, or expressed in a different manner than that shown in the example above.

In an embodiment, default values may be listed for attributes associated with a type. For example, the weight attribute may be assigned a default value of "34," indicating that the default weight of the monitor is 34 lbs. In such an embodiment, a resource of type T_ComputerMonitor may be registered with the system without defining the weight attribute in the resource profile associated with the resource. In this case, the new resource inherits the weight attribute default value of "34," since the new resource is of the type T_ComputerMonitor. This is referred to as inheritance by exclusion, because default attributes augment the resource profile information for resources associated with the type definition having the default attributes, supplying excluded values. In an embodiment, inheritance is a configurable option.

In one embodiment, a type definition may include default values that may not be changed by altering the attribute in the resource profile for the resource that is associated with the type. In this embodiment, attributes in a resource profile do not override the attributes inherited from the type definition.

In another embodiment, a resource profile may override default values in the type definition. The type definition may, for example, define which attributes may be overridden. When a resource profile defines the attribute, the clusterware manager will consider the attribute as defined in the resource profile, for that resource. Other methods of overriding attributes specified in a type definition may be implemented. For example, a resource profile may list an attribute with a switch, such as "–0" for "override" to indicate that the configuration is intended to override a default value.

In an embodiment, a type definition may include an attribute specifying that any resource of that type depends upon another type. For example, a definition for a type meant to be associated with DBMSs may include an attribute indicating that any resource (DBMS) of the type is dependent upon the T_VIP 220 type. Alternately, a type may depend on a type in an embodiment.

Dependency Chains and Multiple Dependencies

FIG. 2 is a block diagram illustrating a dependency chain in an embodiment. A dependency chain is a series of dependencies, where a resource or resource type that is depended upon by another resource or resource type, depends upon another resource or resource type. Multiple dependencies occur when a single resource or resource type depends upon more than one resource or resource type. Multiple dependencies may be combined with dependency chains, which may include dependencies based on the type of resource without specifying a particular resource.

For example, HTTPD1 210 depends upon two separate resource types: T_VIP 220 and T_DBMS 230. In turn, T_DBMS 230 depends upon T_VIP 240. HTTPD1 210 therefore requires a resource to satisfy each dependency.

The T_VIP 220 type dependency and the T_VIP 240 type dependency may be satisfied with any available VIP in VIP pool 260, such as VIP1 260A. The T_DBMS 230 type dependency may be satisfied by any DBMS in DBMS pool 250, such as DBMS1 250A.

The dependency chain shown in FIG. 2 is an example embodiment, and dependency chains will vary based on the configuration of each clusterware system. For example, dependency chains may include any number of resources and types.

Example Flow

Figure 3:
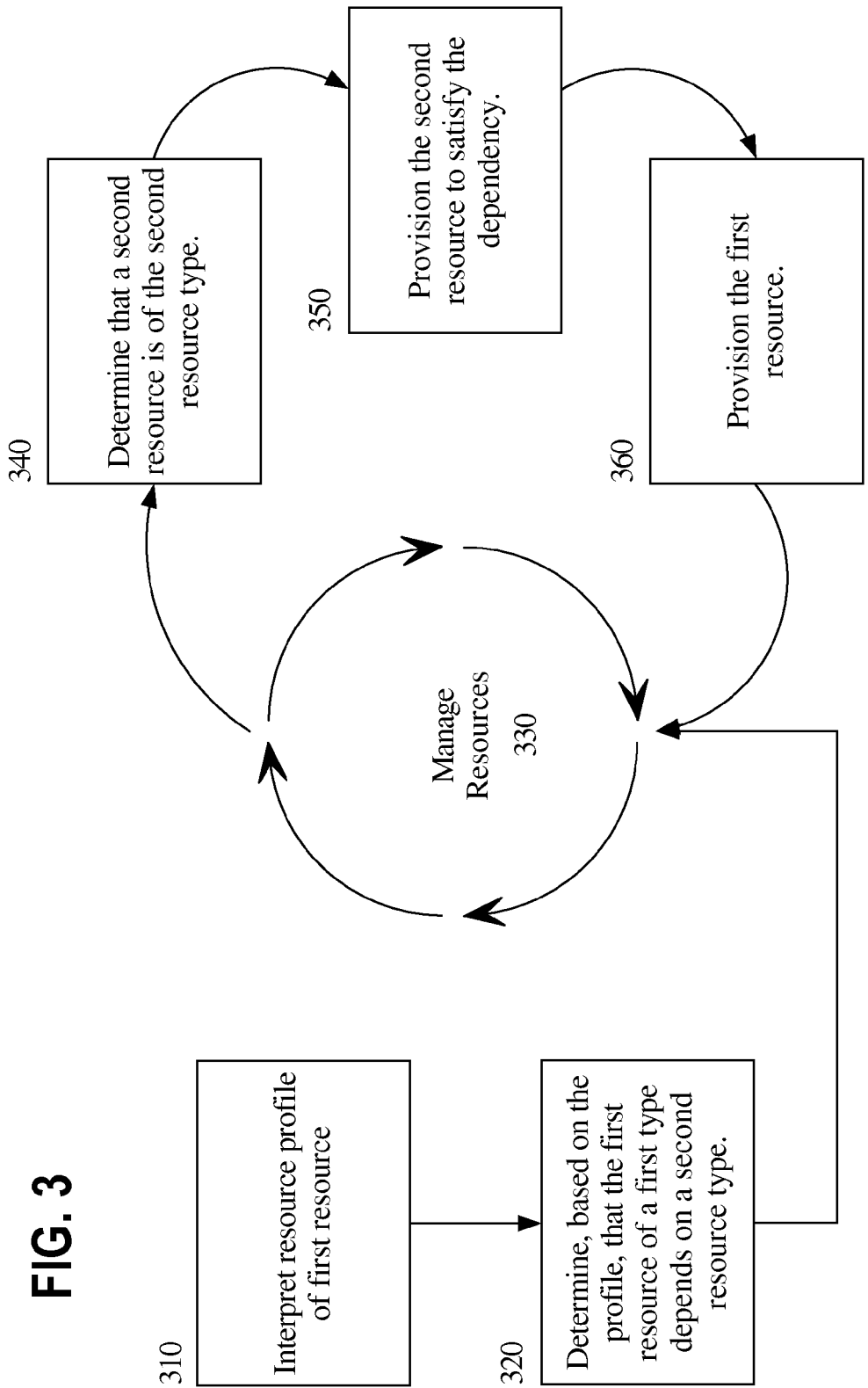
FIG. 3 is a flow diagram illustrating an embodiment.

FIG. 3 is a flow diagram illustrating an embodiment. At step 310, the clusterware policy engine 110 interprets a resource profile of a first resource. At step 320, the clusterware policy engine 110 determines, based on the resource profile, that the first resource, which is a resource of a first type, depends on a second type. The clusterware engine 110 manages resources at step 330. Managing resources includes, at step 340, determining that a second resource is a resource of the second resource type. At step 350, the second resource is provisioned in order to satisfy the dependency of step 320. At step 360, the first resource is provisioned, now that a resource of the required type has been provisioned to support the dependency of the first resource. The managing of resources step 330 continues as long as the clusterware policy engine 110 is active.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
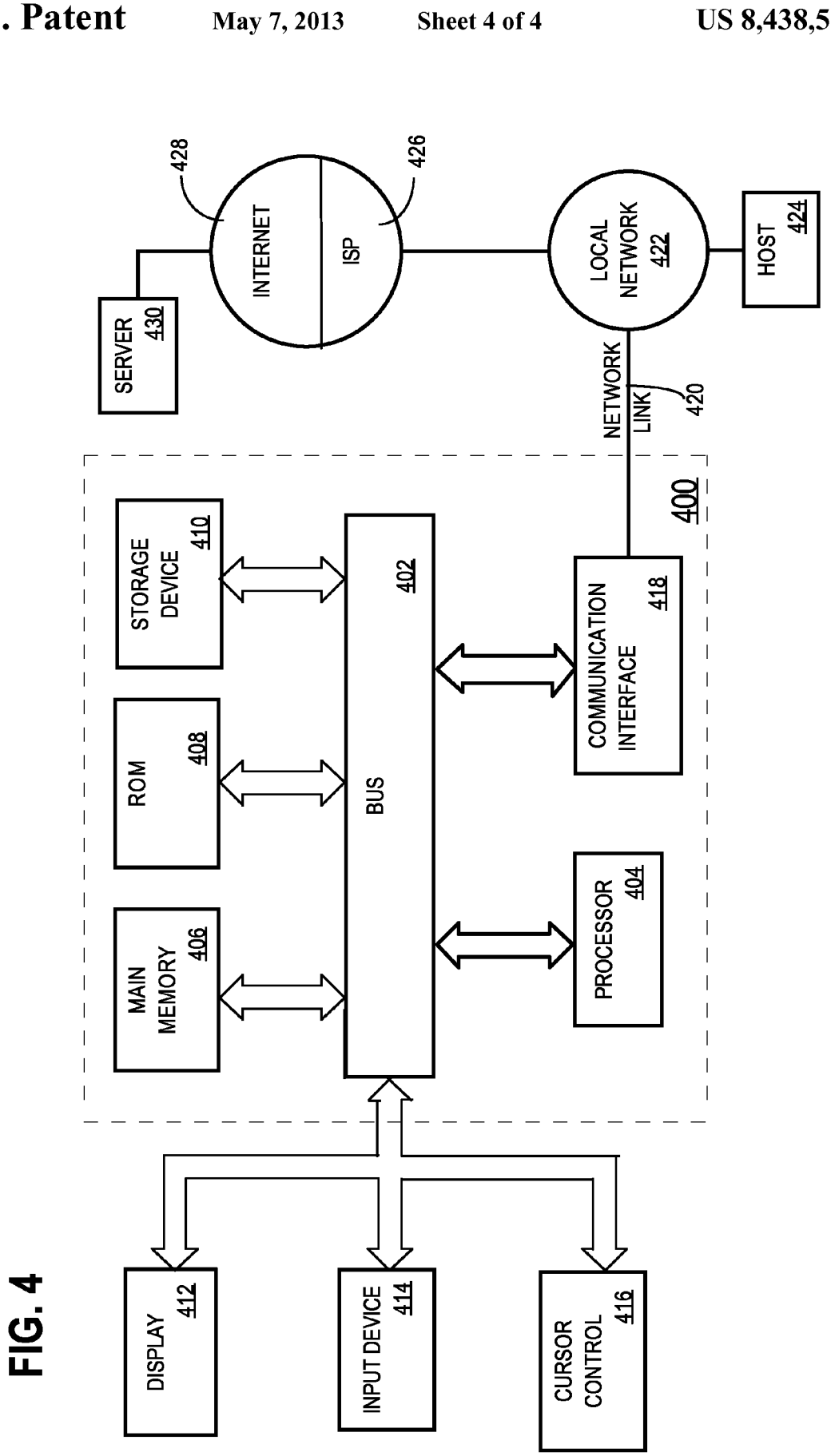
FIG. 4 illustrates a computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for provisioning resources for an application, the method comprising:
   interpreting a resource profile of a first resource in a plurality of resources,
      wherein each resource in the plurality of resources is a logical or physical entity that enables the application to provide services, and the resource profile includes one or more attributes of the first resource,
      wherein at least one attribute defines a dependency between the first resource and a resource type and not any particular resource of that resource type, and
      wherein at least one attribute is inherited by the resource profile from a type profile that includes default attributes that augment the resource profile by supplying a value for at least one attribute that is not defined in the resource profile;

determining, based on the resource profile of the first resource that the first resource is of a first type and has a dependency on a second resource type; and managing the plurality of resources by at least:
  determining that a second resource is an instance of the second resource type;
  provisioning the second resource to satisfy the dependency; and
  provisioning the first resource.

2. The method of claim 1,
wherein the plurality of resources includes a plurality of resources having a second type; and
further comprising selecting the second resource from the plurality of resources having the second type.

3. The method of claim 1,
wherein the resource types are part of a resource type hierarchy; and
wherein the step of managing the dependencies further includes determining, based at least in part on the resource type hierarchy, that a third type satisfies a dependency specifying the second type.

4. The method of claim 3, wherein:
a third type is a sub-type of the second type; and
the step of managing includes provisioning a third resource based at least in part on the resource profile attributes in the resource profile of the first resource.

5. The method of claim 1, further comprising:
determining that a second resource of the second resource type has a dependency upon a third resource type; and
before provisioning the second resource, provisioning a resource of the third resource type.

6. The method of claim 1, wherein said resource profile attributes include at least one attribute that does not define a dependency.

7. A non-transitory computer-readable storage medium storing instructions which, when executed, cause one or more processors to perform the steps of:
  interpreting a resource profile of a first resource in a plurality of resources,
    wherein each resource in the plurality of resources is a logical or physical entity that enables an application to provide services, and the resource profile includes one or more attributes of the first resource,
    wherein at least one attribute defines a dependency between the first resource and a resource type and not any particular resource of that resource type, and
    wherein at least one attribute is inherited by the resource profile from a type profile that includes default attributes that augment the resource profile by supplying a value for at least one attribute that is not defined in the resource profile;
  determining, based on the resource profile of the first resource that the first resource is of a first resource type and has a dependency on a second resource type; and
  managing the plurality of resources by at least:
    determining that a second resource is an instance of the second resource type;
    provisioning the second resource to satisfy the dependency; and
    provisioning the first resource.

8. The non-transitory computer-readable storage medium of claim 7,
wherein the plurality of resources includes a plurality having a second type; and
further comprising instructions for selecting the second resource from the plurality of resources having the second type.

9. The non-transitory computer-readable storage medium of claim 7,
wherein the resource types are part of a resource type hierarchy; and
wherein the step of managing the dependencies further includes determining, based at least in part on the resource type hierarchy, that a third type satisfies a dependency specifying the second type.

10. The non-transitory computer-readable storage medium of claim 9, wherein:
a third type is a sub-type of the second type; and
the step of managing includes provisioning a third resource based at least in part on the resource profile attributes in the resource profile of the first resource.

11. The non-transitory computer-readable storage medium of claim 7, further comprising instructions for:
determining that a second resource of the second resource type has a dependency upon a third resource type; and
before provisioning the second resource, provisioning a resource of the third resource type.

12. The non-transitory computer-readable storage medium of claim 7, wherein said resource profile attributes include at least one attribute that does not define a dependency.

* * * * *

UNITED STATES PATENT AND TRADEMARK OFFICE
CERTIFICATE OF CORRECTION

PATENT NO. : 8,438,573 B2
APPLICATION NO. : 12/688739
DATED : May 7, 2013
INVENTOR(S) : Gusev et al.

Page 1 of 1

It is certified that error appears in the above-identified patent and that said Letters Patent is hereby corrected as shown below:

On the Title page, in column 2, Item [56] under "Other Publications", line 1, delete "Adminstration" and insert -- Administration --, therefor.

On Title page 2, in column 2, Item [56] under "Other Publications", line 1, delete "Adminstration" and insert -- Administration --, therefor.

Signed and Sealed this
Third Day of September, 2013

Teresa Stanek Rea
*Acting Director of the United States Patent and Trademark Office*